May 25, 1943.  L. W. NASH  2,320,094
APPARATUS FOR HANDLING MATERIAL
Filed Aug. 15, 1940  9 Sheets-Sheet 1

INVENTOR.
LEONARD W. NASH
BY
ATTORNEYS.

May 25, 1943.  L. W. NASH  2,320,094
APPARATUS FOR HANDLING MATERIAL
Filed Aug. 15, 1940  9 Sheets-Sheet 3

Fig. 3

INVENTOR.
LEONARD W. NASH
BY
ATTORNEYS.

May 25, 1943.   L. W. NASH   2,320,094
APPARATUS FOR HANDLING MATERIAL
Filed Aug. 15, 1940   9 Sheets-Sheet 4

INVENTOR.
LEONARD W. NASH
BY
ATTORNEYS.

May 25, 1943. L. W. NASH 2,320,094
APPARATUS FOR HANDLING MATERIAL
Filed Aug. 15, 1940 9 Sheets-Sheet 5

INVENTOR.
LEONARD W. NASH
BY
ATTORNEYS.

May 25, 1943.                L. W. NASH                2,320,094
APPARATUS FOR HANDLING MATERIAL
Filed Aug. 15, 1940          9 Sheets-Sheet 6

Fig. 10a

INVENTOR.
LEONARD W. NASH
BY
ATTORNEYS.

May 25, 1943.  L. W. NASH  2,320,094
APPARATUS FOR HANDLING MATERIAL
Filed Aug. 15, 1940  9 Sheets-Sheet 8

INVENTOR.
LEONARD W. NASH
BY
ATTORNEYS.

May 25, 1943.  L. W. NASH  2,320,094
APPARATUS FOR HANDLING MATERIAL
Filed Aug. 15, 1940   9 Sheets-Sheet 9

INVENTOR.
LEONARD W. NASH
BY
ATTORNEYS.

Patented May 25, 1943

2,320,094

UNITED STATES PATENT OFFICE 2,320,094

APPARATUS FOR HANDLING MATERIAL

Leonard W. Nash, Damascus, Ohio, assignor to E. W. Bliss Company, Brooklyn, N. Y., a corporation of New Jersey Application August 15, 1940, Serial No. 352,804

10 Claims. (Cl. 214—6)

This invention relates to apparatus for handling sheet or slab material and is particularly directed to handling such material in connection with metal working machinery, as rolling mills, forming presses and the like.

In many manufacturing processes large sheets or slabs of material must be handled, preferably in such a manner that they are retained in a horizontal position. These requirements necessitated handling equipment of sufficient size to handle the loads involved and of relatively large floor area to permit the transfer of material to and from the machine.

In rolling mills, for instance, the sheet or slab is fed to the rolls at one side and is removed therefrom at the other. In many cases a single sheet is passed through the mill, first in one direction and then in the opposite direction. This is continued until the desired reduction is obtained, whereupon the next sheet is rolled. During the rolling operation the material increases in length and this means that a greater floor area is required at the end of the operation than is required at the beginning.

It is known that equipment for the general purposes outlined above has been built in which a slab or sheet is first passed through the mill and is then transported around the mill and again entered between the rolls for a further pass without reversing the roll direction of rotation. This operation requires an abnormal amount of floor space compared with the size of the machine involved and also requires the unnecessary labor of several operators in directing the sheets or slabs through the circuitous course from one side of the rolls back to the other.

The general object of my invention has been to provide material handling equipment of the type outlined above, although not limited in use to rolling mills, which will handle sheets or slabs in large numbers at a considerable rate of production and with a minimum of floor space and human labor. The equipment is adapted to be operated automatically, semi-automatically or manually and the control mechanism by which this is accomplished constitute an important feature of the invention. A further object of the invention has been to provide both method and apparatus by which a series of slabs or sheets may be passed through a machine and acted upon during such passage and the machine then reversed in direction and the pile of sheets or slabs fed in a reverse direction back through the machine and finally received at their initial starting point. This alternation of movement may take place as many times as desired.

A further object of the invention has been to provide for the horizontal transfer of slabs or sheets through a machine, followed by the subsequent dropping of the same onto a pile of previously acted on material. Still another object of the invention has been to provide for removing the material from the aforesaid pile upwardly and thereafter passing it through the machine to be acted on again. Other objects of the invention will become apparent from the following description and from the drawings.

In general the invention provides for a roll table by which sheet material may be entered upon a conveyor mounted for bodily movement up and down. Positioned above the movable conveyor are a pair of elongate star wheels mounted with their long axes parallel to the direction in which the conveyor extends. The wheels are rotatable about their long axes and are positioned to provide an open space therebetween which can receive a sheet being acted upon. Material may be positioned on the star wheels by lifting cups or other lifting device positioned thereabove. The device is adapted to be lowered to engage and grip the topmost sheet on the pile and raise the same above the star wheels; the star wheels being adapted to rotate in such a direction during the raising of the sheet that the same may pass therebetween. After the sheet has been raised above the wheels a series of opposing horizontal rollers in each arm of the wheel support the sheet in position to be horizontally fed to a machine tool. After the sheet has been placed in this position an automatic feeding device engages the sheet and pushes it along the rollers into the machine.

The machine, as shown, consists of a rolling mill with pinch rolls for feeding material to the working rolls. It will be apparent that many other types of machines may be used in conjunction with the handling equipment and also that manual operations may be accomplished with the aid of the equipment. Press forming operations, cutting operations and the like are all well within the range of equipment with which it is contemplated that the present invention will be used.

After the sheet or slab has passed through the machine it is fed onto a pair of star wheels, roller equipped. After the sheet has been fed onto the rollers the star wheels are rotated in such a direction as to drop the piece through them down onto a vertically movable conveyor, such as already outlined above in connection with the opposite side of the machine. It will be apparent that in some instances a single star wheel may be employed and by its rotation drop the adjacent edge of a sheet or slab, allowing the weight of the piece to pull the opposing edge off of its support and drop down onto the conveyor.

Provision is made, as indicated, to automatically, semi-automatically or manually operate the mechanism above described. It is thus possible, once the equipment is in operation, to automatically pass an entire stack of sheets through the same without manual supervision. Certain portions of the automatic mechanism may be cut out and manually operated such that the machine is semi-automatic in operation. If desired, a workman can cut out the control system and operate the machine controls manually. In this case the star wheel motors and the depiler motors as well as the motors operating the vacuum cup will be required, their operation however, being subject to manual control.

After a series of slabs or sheets have been passed through a machine as outlined about the procedure is reversed and the piled sheets are again raised and fed to the machine from the side opposite to the first feeding. It will be apparent of course that in some instances this reversal of direction is not required and it is not intended that the invention be limited to such features.

To the accomplishment of the foregoing and related ends, said invention, then, consists of the means and steps hereinafter fully described and particularly pointed out in the claims; the annexed drawings and the following description setting forth in detail certain means and one mode of carrying out the invention, such disclosed means and mode illustrating, however, but one of the various ways in which the principle of the invention may be used.

In said annexed drawings—

*Description of mechanical handling mechanism*

Figures 1, 19, 20:
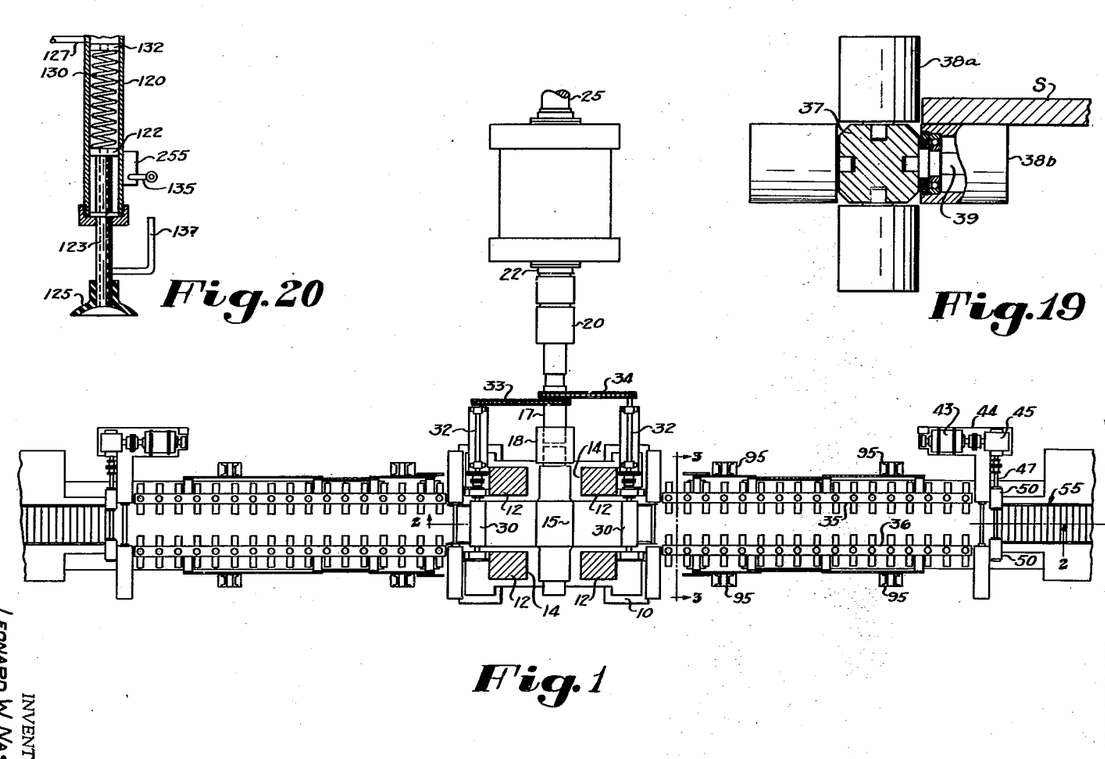
Fig. 1 is a plan view of an installation embodying the present invention showing, partly in section, a rolling mill employed therewith.
Fig. 19 is a transverse section through one of the star wheels showing the roller mounting in detail.
Fig. 20 is a detail section showing the construction of one of the suckers.

Referring now to Fig. 1, there is shown centrally of the figure a rolling mill comprising a foundation 10, on which are carried four uprights 12 spaced apart to provide two opposed bearing windows 14. Journalled in these windows are the rolls 15 by which the material is reduced in thickness. The rolls are driven through a universal spindle 17 connected by universal couplers 18 and 20 to a pinion 22. A shaft 25 leaves the pinion stand and, through a gear box and motor, not shown, is connected with a source of power by which the rolls are rotated.

To feed material to and from the rolls 15, two sets of pinch rolls 30 are provided, one on each side of the rolls 15. The pinch rolls are adjustable vertically and are connected through a universal shaft mechanism 32 with drive chains 33 and 34 driven from spindle 17.

Figure 2:
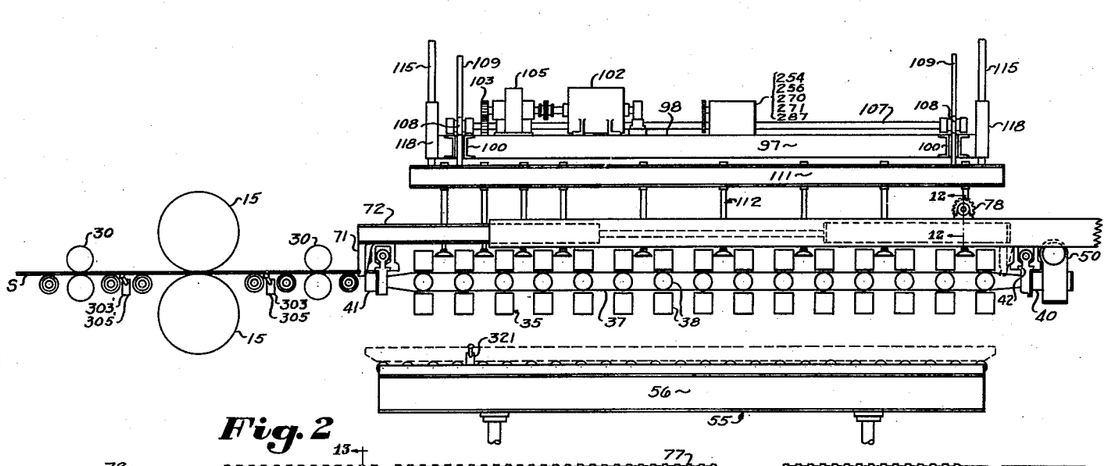
Fig. 2 is a vertical section through Fig. 1, as indicated by the line 2—2 thereon.
Figure 3:
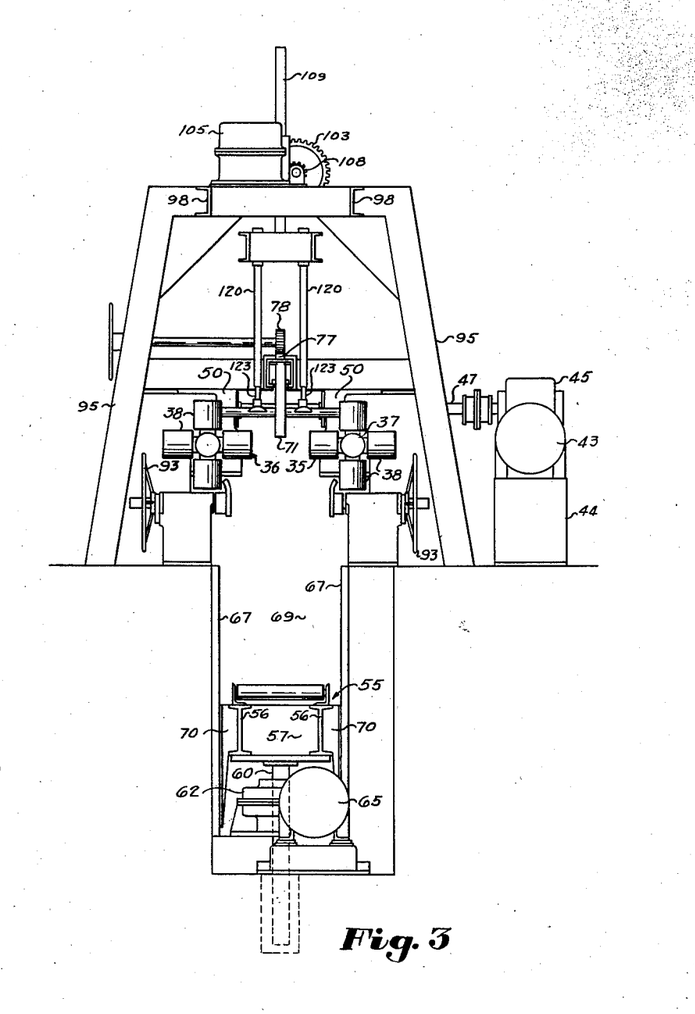
Fig. 3 is a vertical section through Fig. 1 as indicated by lines 3—3 thereon.

The material handling mechanism by which sheets are fed to the mill and removed therefrom is mounted to provide a straight line path perpendicular to the axes of the rolls, as shown in Fig. 1. The mechanism is duplicated on each side of the mill and hence a description of one side will suffice for both. Such mechanism is best shown in Figs. 2 and 3. In Fig. 2 the pinch rolls 30 are mounted in horizontal alignment with a pair of star wheels 35 and 36. Each star wheel comprises a central supporting member 37 on which are rotatably mounted four sets of anti-friction rollers 38, each set being spaced 90 degrees from the other.

As shown in Fig. 19, the star wheels are of such a diameter with respect to the central supporting members 37 that a sheet S is guided at its edges by the vertical rollers 38a. Although only a single roller is shown in Fig. 19, it will be understood that a corresponding roller of the other star wheel cooperates to guide the opposite sheet edge. The sheet itself is, as indicated, supported on a horizontal roll 38b of each star wheel member. The rollers themselves are rotatably carried on stub shafts 39 which are press fitted into suitable bores of the member 37 and otherwise secured in any desired manner. The rollers themselves are carried on the stub shaft, which is non-rotatable by ball anti-friction bearings of the usual type. Oil seals for the retention of lubricant may be provided, if desired.

The star wheels are horizontally movable toward and from each other to accommodate material of varying widths. Thus, each support 37 is rotatably carried in end bearings 40 and 41. The bearings in turn are slidably mounted in transverse ways 42 and are adjustable therein to permit control of the spacing between the wheels. To rotate the star wheels an electric motor 43, controlled as hereinafter described, is provided mounted on a base 44 and drivingly connected through a gear box 45 to a splined shaft 47. Due to the splines on the shaft it is possible to drive gears carried within the head 50 irrespective of the position in which the same is mounted. The gears, not shown, in turn drive pinions keyed to rotate with the supports 37. Thus, as the motor 43 is driven the two star wheels are rotated in unison and the gears and pinions are so arranged that they are right to left with respect to each other, thus driving one star wheel in a clockwise direction while the other star wheel is driven in a counter-clockwise direction.

A depiler conveyor 55 is mounted beneath and centrally of the star wheels and extends in the same direction therewith. The depiler comprises a pair of I-beams 56 suitably secured together by cross-members 57 to provide a rigid structure carried on the elevating members 60.

Each elevating member 60 is threaded to be engaged by a worm gear nut (not shown), but held in a gear case 62 for rotative movement only. Thus as the worm gear nut is rotated the members 60 are raised or lowered. The worm gear is driven by a worm (not shown), which in turn is rotated from a reversible electric motor 65 controlled as set out hereafter. A motor shaft connects the worm gear of one support 60 with the worm of the other support 60 to provide a synchronized drive for raising and lowering the depiler conveyor 55.

To guide the conveyor in its vertical movement, a series of guide rails 67 are secured to the sides of the foundation pit 69 and provides ways for members 70 rigidly secured to the depiler conveyor.

Figure 11:
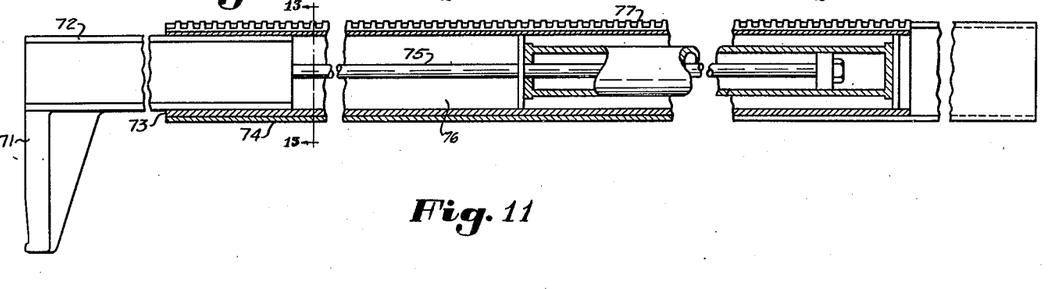
Fig. 11 is a longituding section through the mechanism for feeding material.
Figure 12:
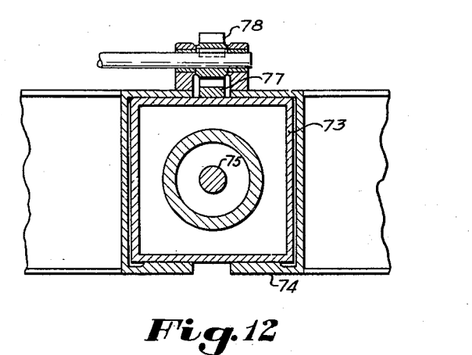
Figs. 12 and 13 are sections through Fig. 2 and Fig. 11 respectively, as indicated by the lines 12—12 and 13—13.
Figure 13:
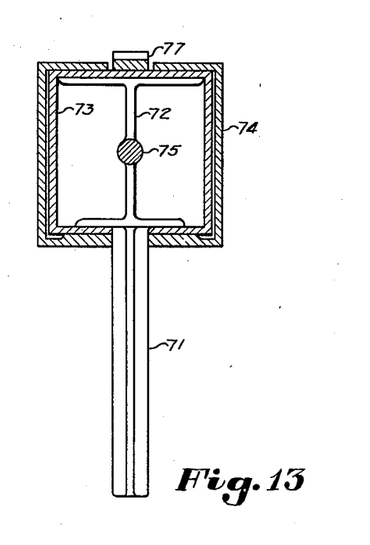
Figure 14:
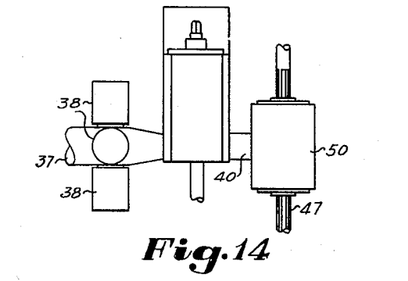
Figs. 14, 15 and 16 are a plan view and a front and side elevation respectively, of the supporting mechanism for the star wheels.
Figure 15:
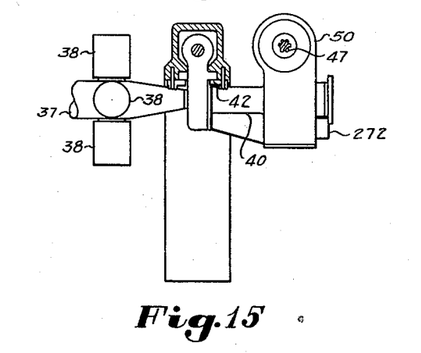

The movement of the material as it leaves the pinch rolls and passes on to the star wheel rollers preparatory to dropping onto the depiler conveyor is limited by a stop mechanism, as best shown in Fig. 11. This also serves, as hereafter described, to feed material to the mill.

This mechanism comprises a pusher 71 supported rigidly on an I-beam 72, which is slidingly received in a box-like member 73. The box member in turn is slidingly received in an outer case or frame 74. The member 72 is operatively connected with a piston 75 operated in either direction under fluid pressure admitted to a cylinder 76 on opposite sides of the piston as desired. In the feeding position the pressure acts to move the pusher 71 and feed a sheet into the machine as hereafter set out. The pusher is withdrawn to an inactive position by releasing the air on the right hand side of the piston (Fig. 11) and admitting it to the left hand side.

To permit adjustment of the pusher arm for handling stock of different lengths a rack 77 is rigidly mounted on the top of the box member 73 and under the action of a pinion 78 racks the cylinder and its supporting box member back and forth to control the position of the operative stroke of the pusher 71 under the influence of the fluid pressure in the cylinder.

Figure 17:
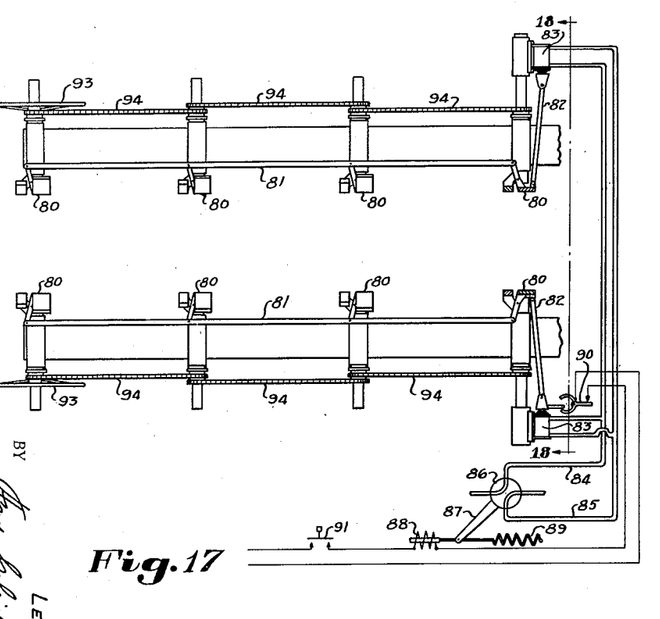
Fig. 17 is a schematic plan view showing the shuffling mechanism and its operating control.
Figure 18:
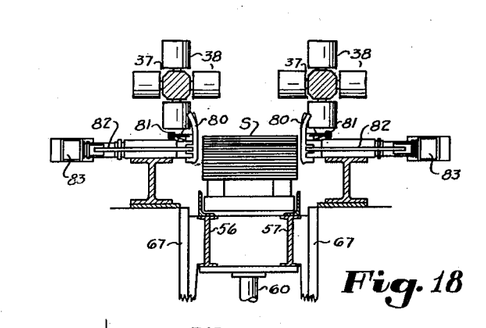
Fig. 18 is a section through Fig. 17, as indicated by the line 18—18 thereon.
Figures 21, 22:
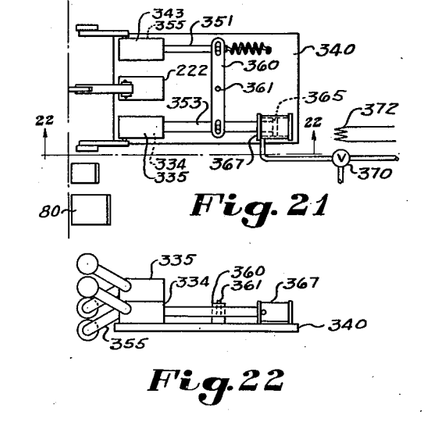
Fig. 21 is a detail plan view showing the control mechanism adjacent the shufflers.
Fig. 22 is a section through Fig. 21, as indicated by the line 22—22 thereon.

The plates or sheets dropping through the star wheels onto the depiler conveyor are shuffled during their fall and while they lay on the pile to insure the formation of a pile with straight sides. This shuffling mechanism is best shown in Figs. 17, 18 and 21. Referring to those figures it will be seen that there are provided four pairs of side guides 80 extending in a vertical direction and slightly inclined away from each other at the upper and lower ends to permit centering a sheet falling therebetween. Each of the guides is so mounted that the guides of each pair may be oscillated with respect to each other from a pair of link operating mechanisms. Referring to Fig. 17, it will be seen that the shufflers on each side of the central axis are connected by a common rock bar 81 for simultaneous movement. Links 82 connect the end shufflers to air pistons carried in cylinders 83 respectively.

Air is alternately supplied to opposite sides of each of the pistons through air supply pipes 84 and 85. The pipes are controlled by a four-way valve 86 operating from a link 87 connected to a solenoid 88. The solenoid is adapted to be energized to shift the valve to the active position shown in Fig. 17 while a return spring 89 pulls the valve link 87 toward the right (Fig. 17) to its other active position. The solenoid in turn is connected through a rocking switch 90 to alternately make and break the supply of current to the solenoid. A manually operated normally open switch 91 controls the line to the solenoid and is provided with a holding coil to hold the switch closed after being initially operated until a stop switch is pushed.

At the beginning of a cycle of operation the solenoid 88 is energized, pulling the link 87 against the spring to the position shown in Fig. 17. At this time air under pressure flows into the rearward portions of each of the cylinders 83, forcing them toward each other, and causing the shufflers to go through their first phase of movement. When the piston in the lowermost cylinder 83 is at the inner end of its stroke it will have rocked the switch 90, opening the line to the coil 88 to release the link 87 and permit the spring 88 to shift the valve from the position there shown to a position in which air will be admitted to the sides of the cylinders 83 which had previously been opened to exhaust. At the same time the opposite sides of the pistons which have just been filled with air under pressure, will in turn be open to exhaust. As the pistons are then moved in an opposite direction the second phase of the shuffler cycle will be accomplished, during the course of which the switch 90 will again be shifted to a closed position, energizing the solenoid 88 for operation through a succeeding shuffler cycle.

Sheets of varying width are to be accommodated in the apparatus of my invention and to this end the shuffler mechanisms are adjustable toward and from each other. This is accomplished by a pair of manually operated hand wheels 93, which are each operatively connected to the shufflers on one side of the central axis through sprocket chains 94. As the hand wheel is rotated each of the associated shuffling devices will be screwed in or out, depending upon the direction of the wheel rotation. This continues until an adjusted position is reached and may be effected by the operation of either or both of the hand wheels 93. In the event that it is undesirable to provide two hand wheels 93, adjustment by one hand wheel may be accomplished. This may be done by means of suitable pinions operating through a shaft extending across the end of the star wheel mechanism. Both sets of shufflers may thus be moved in synchronism and adjusted toward and from each other simultaneously. This construction has the advantage of maintaining an unchanged center line for the sheets irrespective of the adjustment.

From the foregoing description it will be seen that if a sheet falls from the star wheels it will be engaged as it lays on top of the pile by the side guides or shuffles which are reciprocated, and will be positioned in the center of the pile.

Figure 10A:
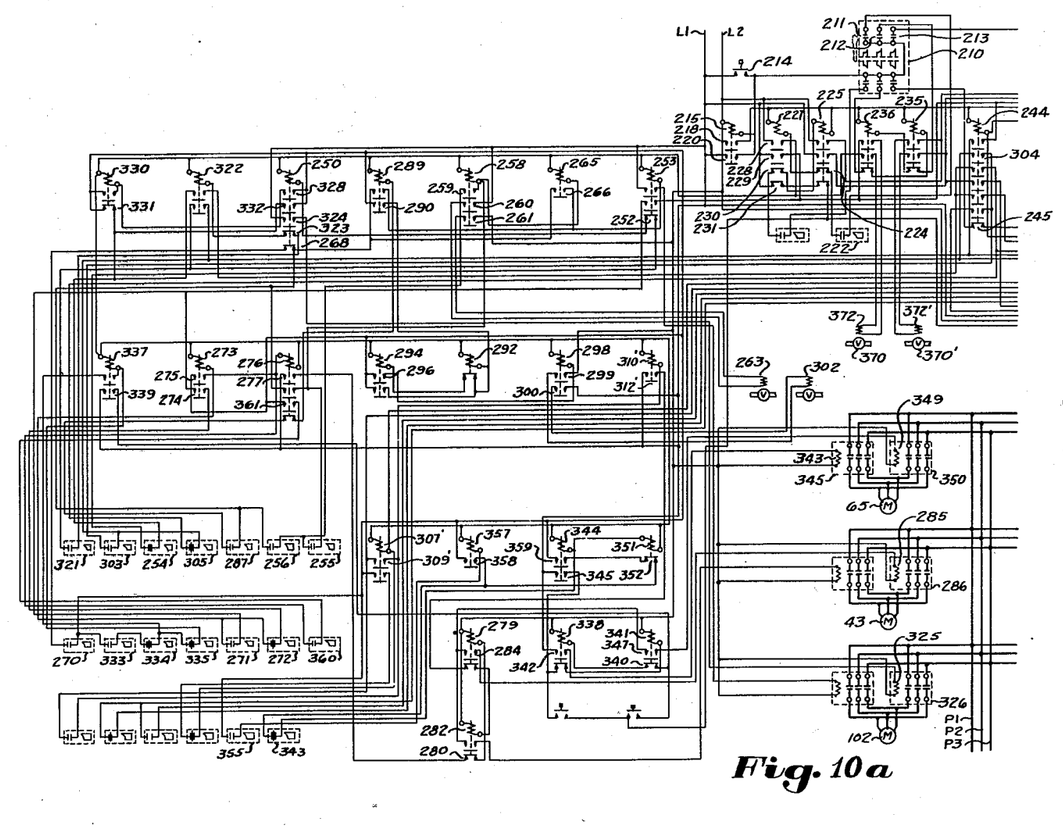
Figs. 10a and 10b show (on two sheets) the wiring diagram for synchronizing the star wheels and the vacuum lifter.
Figure 10B:
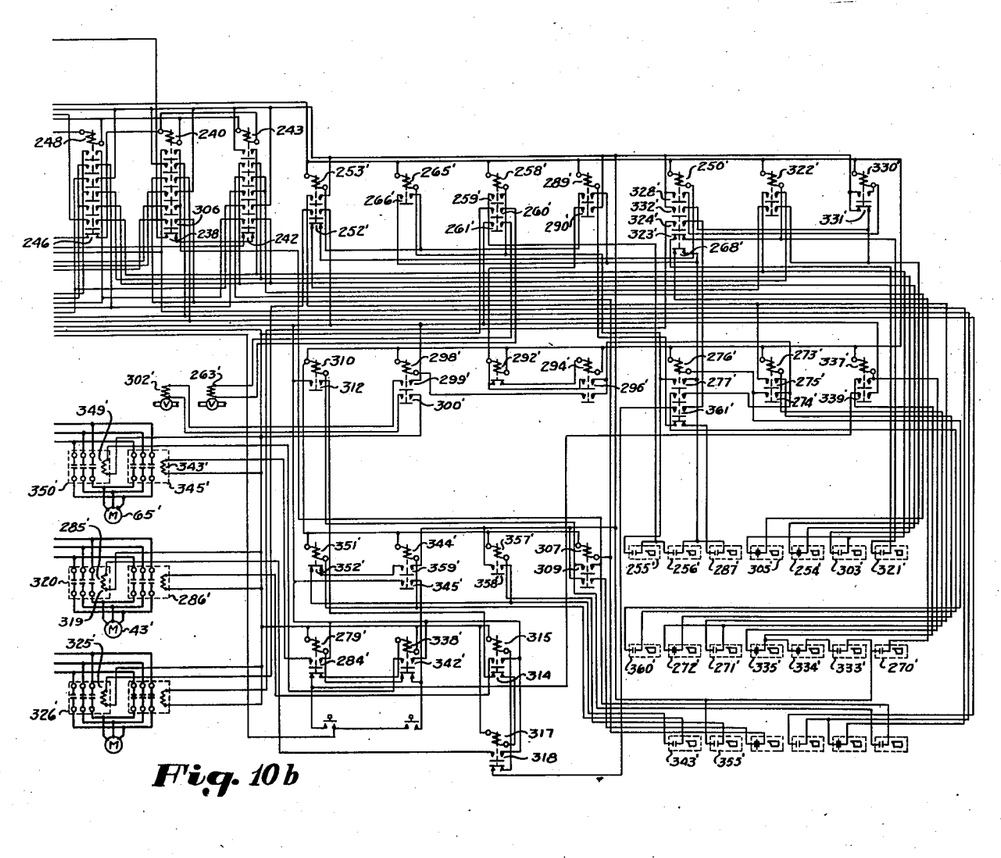

From the mechanism so far described it will be apparent that as a sheet or slab is discharged from the rolling mill or from the rolls it will be fed by the power driven rolls 30 onto the star wheel rollers 38. Electrical control mechanism hereafter described in connection with Figs. 10$^a$ and 10$^b$ will then function to automatically remove the piece from the star wheels. At this time the star wheels will rotate 90 degrees, the one clockwise, and the other counter-clockwise, to permit the sheet thereon to drop downwardly. Just after the sheet has left the star wheels it will be engaged and centered by the oscillating side guides, from which point it will drop onto the depiler conveyor 55. The conveyor is automatically lowered by successive increments as the height of the pile thereon increases to maintain the distance a sheet must drop relatively constant. It is desirable that this distance be as short as possible.

To lift sheets from one of the depiler conveyors and feed them into the machine the vacuum lifting mechanism shown in Figs. 2 and 3 is provided. To this end a series of vertical columns 95, formed of channel members mounted back to back, extend upwardly and support a frame 97. This frame comprises a pair of longitudinally extending structural members 98 connected at each end by a pair of spaced back to back channel members 100. An electric motor 102 is carried by the frame and drives a gear train 103 through a reducer 105. The gear train in turn drives a shaft 107 extending from one end of the frame to the other. The shaft in turn is provided with a pair of pinion gears 108 in mesh with racks 109 which are vertically movable and are guided in the frame 97. Secured to the lower end of each rack are two back to back spaced channel members 111, from which depend two series of vacuum cup mechanisms 112 of a type well known in the art. As shown in Fig. 3 there is a series of cups spaced from each other on opposite sides of the center line. To accurately guide the vacuum cups, a pair of guide members 115 are provided which are journalled at 118 in the frame 98.

The sucker construction is best shown in Fig. 20. All of the suckers are identical in construction and hence the description of one will suffice. This mechanism comprises a sleeve or cylinder 120 in which is slidingly carried a guide 122 secured to a hollow shaft 123 which, at its ends, supports a resilient sucker cup 125.

To evacuate cups after they have been forced into sealing relation with the slab a pipe 127 communicating with the interior of the cylinder is connected to a vacuum pump which draws the air through the hollow piston rod 123 to evacuate the inside of the cup and provide a tight seal between the cup and the sheet due to the normal air pressure on the exterior thereof. The sucker cup is normally urged downwardly at all times by the spring 130, bearing at one end against the guide 122 and at the other end against a ring 132 in the cylinder 120.

The automatic operation of the sucker to evacuate the same and admit air pressure thereto at predetermined times in the equipment cycle of operation is effected by a limit switch to be hereafter described and identified by the reference character 255. This switch includes an arm 135 which is engaged and shifted by an arm 137 secured to and movable with the piston rod 123.

The vacuum cups are air operated and are supplied from a suitable source in a well-known manner to be alternately evacuated when the cups are in sealing contact with the pieces to be lifted and thereafter supplied with air to equalize the air pressure and release the gripped piece, as hereafter described in connection with the control system. The vacuum cups of each set are spaced closer to each other adjacent the feeding means 30 because at the beginning of the rolling operation the slab will be thicker and therefore considerably shorter than at the end.

Figures 4, 5, 6:
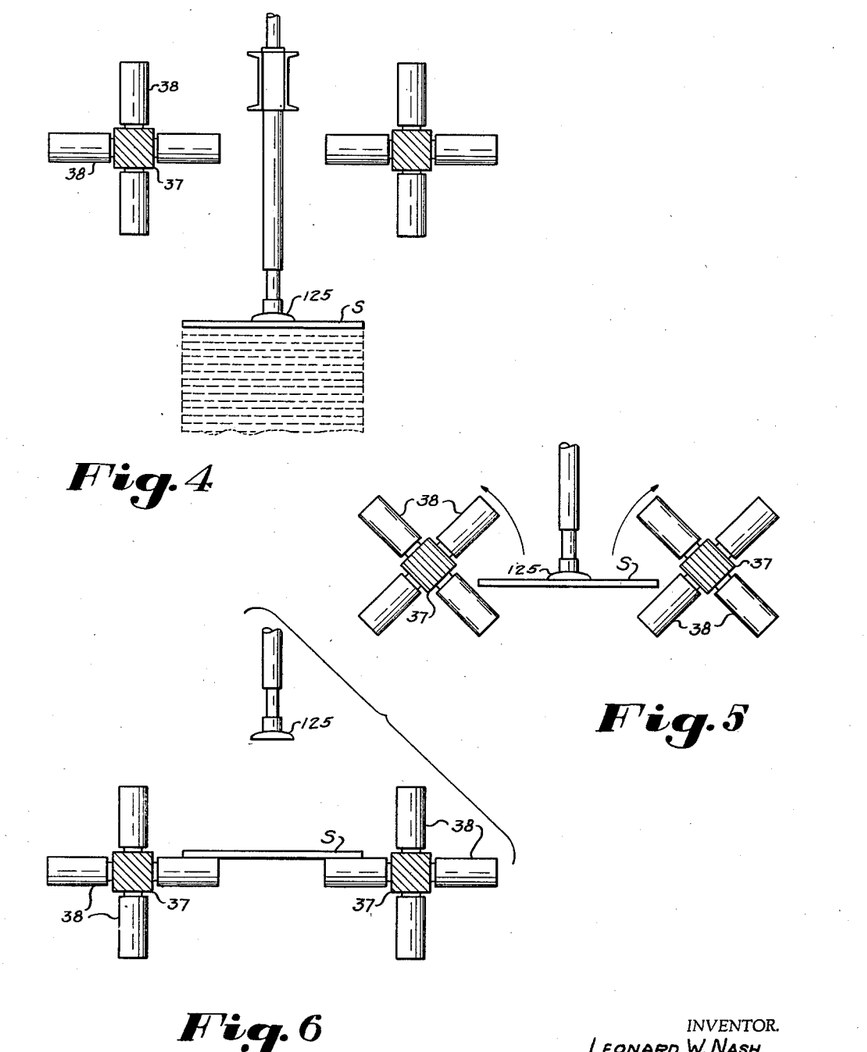
Figs. 4, 5 and 6 are schematic showings of the various positions of the star wheels as a sheet is lifted onto them.

In operation the vacuum cups lift a sheet from the depiler conveyor through the star wheels to a position for feeding horizontally. To this end the star wheels must be rotated in a direction such that the opposing rollers of each wheel are rising. This is accomplished by synchronizing the lifting action of the vacuum cups with the rotation of the star wheels. The synchronous operation of the vacuum cups and the star wheel is shown in Figs. 4 through 6. It will be noted in these figures that a single vacuum mechanism is shown. It will be understood that the general disclosure of the invention calls for two sets of vacuum cups spaced side by side, but under certain conditions it is contemplated that a single set of cups can be used and, for purposes of simplicity, such a construction is schematically shown in these figures.

Referring first to Fig. 4, the uppermost sheet S on a pile is to be lifted up above the star wheels and deposited thereon in order that it may be moved by the pusher 71 between the pinch rolls 30. To accomplish this the suckers descend as above described until the cups 125 engage the top sheet S and effect a vacuum seal therewith. At this time the suckers begin to rise until they have lifted the sheet to a position directly beneath the opposing horizontal arms of the star wheels. When this position has been attained the star wheels begin to rotate in the direction of the arrows, as shown in Fig. 5, in synchronism with the continued upward travel of the sheet. Thus in a manner analogous to a person walking through revolving doors the sheet is raised without interference until it is above a pair of opposed horizontal roller arms 38 of the star wheels, as shown in Fig. 6. In that figure the vacuum has been broken between the sheet and the suckers and the suckers have been raised to the position there shown while the sheet remains on the rollers of the star wheels in position to be fed to the pinch rolls.

Figure 7:
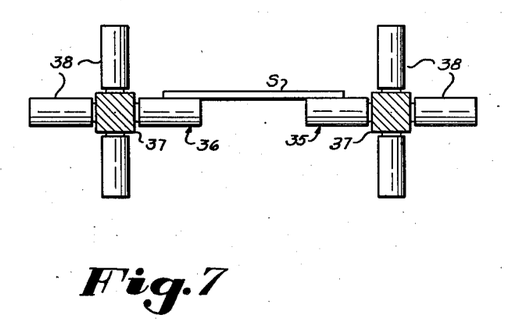
Figs. 7, 8 and 9 are similar showings of the various positions of the star wheels as a sheet is dropped from them to the pile.
Figure 8:
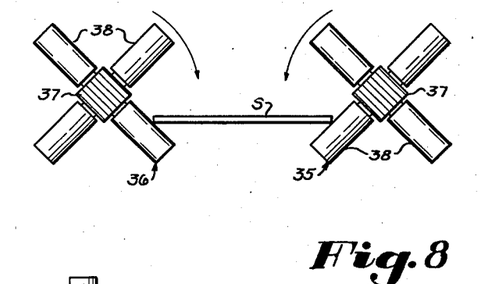
Figure 9:
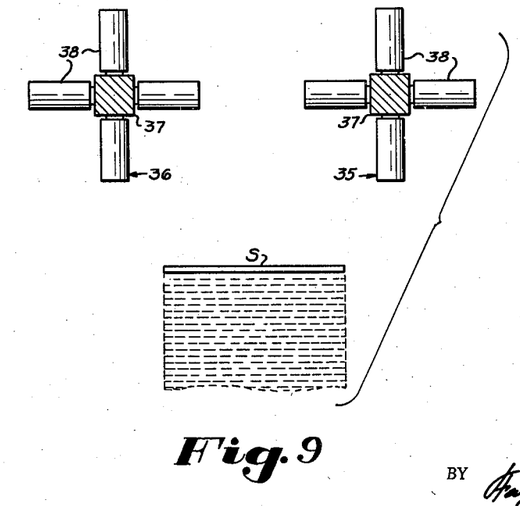

As previously described, on the feed-out side of the equipment a sheet is supported by the star wheels and is dropped through them onto a stack therebeneath. This action is shown in Figs. 7 through 9. In Fig. 7 a sheet is shown supported on the star wheels in position to be dropped between them. As shown in Fig. 8, the star wheels are rotated in the direction of the arrows, lowering a sheet therebetween until, as shown in Fig. 9, it falls free and lands on top of the stack into the position of the sheet marked "S"; the star wheels meanwhile being positioned as shown to receive a succeeding sheet from the mill. The shuffler mechanism shown and described in connection with Figs. 17 through 19 is employed in this operation, but is not shown in these figures in order to render the same as schematic as possible.

Control system

The entire equipment is adapted to be automatically operated, either partially or entirely, and is so wired that selected parts of the equipment may be automatically controlled and other parts manually operated. In this way it is possible upon pushing the starting button to run a stack of sheets from one depiler conveyor or table 55 through the mill to the piling mechanism and load them onto the second table, the motors 65 each operating automatically to vary the table height to provide a relatively constant stack level, both at the loading and unloading stations.

The depiler mechanism under these conditions is automatically operated to the extent that the suckers pick up a sheet at the in-feed side of the mechanism and lift it above the star wheels, the wheels rotating in synchronism with the sheet's rise to permit its passage therethrough in a horizontal position. The wheels thereafter come to rest to support the raised sheet after it has been released by the vacuum cups. At this time the pusher arm 71 (Fig. 11) is automatically operated through its piston and cylinder to push the sheet between the initial feed-in pinch rolls 30 of the mill, by which it is fed onto the mill from which it is ultimately discharged to a set of star wheels on the opposite side.

The feed-out star wheels, as part of the automatic mechanism, operate in synchronism with the rest of the equipment to drop a sheet vertically onto the piling conveyor or table 55. As the height of the stack on the piling table builds up, the stack is automatically and periodically lowered to permit continued operation with an increasing number of sheets.

The mechanism and the timing circuits by which the foregoing automatic and semi-automatic operations are accomplished are shown in the wiring diagrams of Figs. 10ª and 10ᵇ. The mechanism there shown consists of the requisite relays, solenoids, switches and the like, many of which are not shown elsewhere in the drawings of the machine. The operating switches and motors are shown in the mechanical embodiment of the machine by reference characters corresponding to those used in the wiring diagram, it being understood that the operation of the mechanism is described only in one direction of sheet feeding and that the wiring diagrams include parts which are inactive at this time but come into play when a sheet is fed in a reverse direction in the machine.

Three motor driven units provide the major moving forces to pass a sheet from one pile to the other through the mill rolls 15 or the like. As shown in the drawings and hereafter described, the sheets are initially placed on one depiler conveyor or table 55 which is elevated through the gear train driven by the reversible electric motor 65.

The sheets as above described are raised from the pile by the vacuum cups 125 and deposited upon the star wheels 37 driven by the motor 43.

It will be understood that where, in the following description, the control of only one star wheel, piler or vacuum cup mechanism is set out, there is in fact a duplicate mechanism which is used when material is fed from the opposite direction. Each of the motors 43, 65 and 102 on each side of the mill are connected to a three-phase power line P—1, P—2 and P—3 (Fig. 10ª). The star wheel motor 43 is connected into the line through forward and reversing contactors hereafter described, by which the star wheels are rotated to drop a sheet therethrough, on the feed-out side of the equipment or to be raised to permit passage of a sheet upwardly therethrough on the feed-in side of the equipment.

It will be apparent that as sheets are raised onto the corresponding star wheels or dropped through them the height of the stack beneath will decrease or increase as the case may be. For this reason there is provided, as an auxiliary part of the mechanism, controls by which the height of the depiler conveyor tables 55 may be varied at will. These tables are each driven by a reversible motor 65, the motors themselves being controlled as hereafter described and as shown in connection with Figs. 10ª and 10ᵇ.

The suckers on each side of the equipment are raised and lowered by motors 102 respectively, which motors are likewise controlled as hereafter described.

The power means operative to actually handle the sheets is embodied in the motors 43, 65 and 102 and also in the fluid cylinder and piston for operating the pushers 71. The pinch rolls 30 are to be considered as part of this power mechanism and they are, as heretofore described, driven by sprocket chains 34 from the main source of power to the mill roll.

The entire mechanism may be automatically operated by means of the control system to be described or each of the aforementioned power applying devices may be controlled manually without regard to synchronism between it and another part of the equipment. It will follow from the present specification that it is contemplated to semi-automatically control the equipment to the extent that certain of the power units may be conrolled manually and other parts controlled automatically.

Under automatic operation there would normally be the possibility of grounding or shorting parts of the electrical control system. This is especially true because the invention represents in one form two complete material handling equipments in which part of one and part of the other cooperate to perform a feed in one direction and a second part of the one and of the other cooperate to feed in a reverse direction. For purposes of safety interlock control switches and safety cut-outs have been inserted in the circuits where necessary to prevent such happenings.

*Main control wiring diagram*

The two sheets, Figs. 10ª and 10ᵇ, when placed end to end with a right-hand end of Fig. 10ª next to the left-hand end of Fig. 10ᵇ, show the complete circuits. In connection with these figures it will be noted that the electrical elements are numbered beginning with 210 to make for ease of identity.

As drawn, the diagram shows all limit switches, relays and contactors in their normal operative position ready to begin to function when a sheet is started through the mechanism. The description pertains to the instruments used in feeding in one direction and the instruments which are idle at this time are numbered in primed figures corresponding to the character applied to the active instruments and are duplicates used in feeding in the opposite direction.

A charge of material, as slabs or sheets, will have been placed on the conveyor 55, which is electrically operated chiefly by the control instruments of Fig. 10ª and during the course of operation of the machine this material will be fed, one sheet at a time, to the mechanism and thence through the mechanism and onto the conveyor represented by the control instruments at the right-hand side of the wiring diagram, or as shown in Fig. 10ᵇ.

The following description of the wiring diagram will be best followed by referring almost wholly to Figs. 10ª and 10ᵇ.

*Starting switches and interlock safety controls*

After a charge has been placed on the conveyor 55 as set out above a master switch 210 is thrown to the forward position, which closes contacts 211, 212 and 213.

Preparatory to this operation a push button 214 will have been depressed, setting up a circuit through the no voltage protection relay 215, closing the contacts 218 and 220. In the event that the circuit becomes overloaded the switch will open and prevent damage to the control apparatus. Then upon again closing the switch the apparatus is ready for continued operation. The closing of the contact 211 in the master switch establishes a circuit through the limit switch 222, which has been closed by the adjustment of the shuffling mechanism, as shown in Fig. 21. This circuit leads through the closed contacts 224 of the reverse relay 225 and then to the coil of a forward relay 227. When the coil 227 is energized it closes contacts 228 and 229 at the same time opening contacts 230 and 231. The circuit of the coil of the relay 225 is opened upon the opening of the contact 230.

This switch 222 is mounted for movement with the switches, hereafter described, which control the raising of the stack as sheets are removed. Thus as the last sheet is removed the switch becomes operable to shut down the apparatus. At the same time a corresponding switch 222' on the piling side is withdrawn from the region of the sheets being piled and is accordingly inoperative at that time.

This mechanism provides an electrical interlock, preventing the forward and rearward motions of the machinery from operating at the same time and providing a safety control. Thus, in the event that the system becomes grounded or short circuited at some point no harm can result to the parts.

A circuit from the line L—2 to one side of all the coils on the forward relays is effected upon closing the contact 228. Similarly, closing the contact 229 provides a circuit from the line L—1 to various parts of the forward relays and limit switches, as hereafter set out.

Upon closing the contact 212 of the master switch there is set up a circuit through the closed contacts of a relay 235, energizing a relay coil 236. In the same manner, closing the contact 213 establishes a circuit through a pair of closed contacts 238 of a relay 240, which circuit leads through further contacts 242 of a relay 243 and then to the relay coil of a relay 244. Energizing this latter coil closes all of the normally open contacts and opens the one normally closed contact.

A further electrical interlock is provided by opening the normally closed contact 245, which interlock operates through closed contacts 246 of a relay 248, thereby preventing the inopportune energizing of the relays 240 and 243.

*Circuits affecting operation of feeding mechanism*

The sucker mechanism begins to move downwardly toward the pile of material on the feed-in conveyor after the circuits have been established upon closing the relay 250. This is accomplished because the relay 250 acts through contacts 252 of a relay 253 and a normally closed limit switch 254 to derive energy from the line L—2.

The suckers continue their downward movement until complete contact is made between the rubber cups 125 and the topmost sheet on the pile. When the suckers have reached the intended limits of travel the switch 254 is opened automatically, thereby terminating the downward movement of the suckers. Simultaneously with such opening a limit switch 255 (Fig. 20) is closed and also a further switch 256. This completes the circuit to the coil of a relay 258 which is equipped with maintaining contacts 259 by which it is held in the circuit.

The suckers are evacuated, holding the uppermost sheet against them, by a further operation of this relay 258. It will be seen that as this relay is actuated it closes contacts 260 and 261, thereby energizing the coil of a vacuum valve 263, opening the same to permit evacuation of the suckers in any well known manner. The reduction of air pressure within the suckers seals the same against the sheet and thus, as the suckers are then raised, they lift the sheet to a position above the star wheels.

The suckers and the attached sheet are at this time in position to be raised above the star wheels and this motion is initiated by actuating a timing relay 265 which is energized at the same time as the relay 258. The relay 265 acts to close contacts 266 to thereby establish a circuit through the relay 253 by way of the closed contacts 268 of the relay 250.

Figure 16:
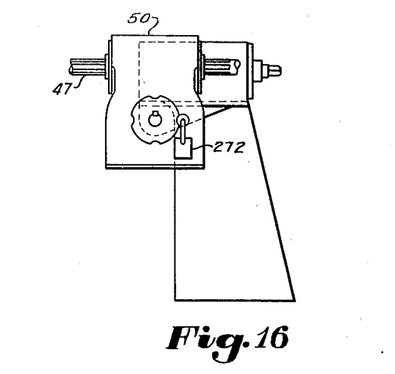

The upward motion of the suckers continues until they have reached their maximum upper point, at which time a limit switch 270 in line with the contacts 268 is opened. In this same connection a limit switch 271 will have been momentarily closed at the bottom of the sucker stroke to thereby energize a relay 273 and start the rotation of the star wheels. The effect of this is to establish a circuit which is maintained through a normally closed limit switch 272 and a set of contacts 274 of the relay 273. The switch 272 (Fig. 16) is controlled by a four-notch cam on the star wheel support 37. In the same circuit contacts 277 of a relay 276 energize a further relay 279 through normally closed contacts 280 of the relay 282.

Rotation of the star wheels is commenced by setting up the circuits described immediately above. This is effected because contacts 284 are closed, establishing a circuit to a coil 285 of contactors 286. The two star wheels are so mounted that they are set in rotation simultaneously but in opposite directions. The arms and the rollers supported thereby are rotated in a direction such that the inner wheel portions are each rising. Their rate of rotation is such that it coincides with the upward movement of a sheet supported by the suckers. Thus, as the sheet is lifted the star wheels rotate in such a manner that there is no interference between them and the sheet as the latter passes from beneath them to a position above them and is maintained during that time in a horizontal plane. This has been described in connection with Figs. 4 through 6.

After a sheet has been raised above the wheels, their rotation is stopped due to the tripping of the limit switch 272, thereby deenergizing the relay 273. This in turn deenergizes the relay 279, releasing the contacts 274 thereof and deenergizing the holding coil 285 heretofore described in connection with the contactors 286.

The vacuum grip of the suckers on the sheet is released at the time the star wheel rotation terminates to permit the sheet to be freely supported on the rollers in position to be entered between the pinch rolls by the pusher 71. To attain this result the limit switch 270 is so mounted that it opens at the time the star wheel rotation ceases, thereby opening the circuit through contacts 268 of the relay 250 and, as indicated in the wiring diagram, opening the contacts 259 and deenergizing the relay 258. This in turn opens contacts 260 and 261 to deenergize the coil 263, releasing the vacuum holding valves of the cups. Air then flows into the cups until the atmospheric pressure is balanced, releasing the suction on the supported sheet and allowing the same to rest freely on the star wheel tables.

After a sheet has been placed on the star wheel it is then necessary to actuate the pushing mechanism shown in Figs. 2 and 11 for pushing the same between the pinch rolls. To this end a limit switch 287, mounted on the sucker frame 97, is closed at the same time the limit switch 256 is opened, thereby setting up a circuit through the closed contact of the relay 276 to the coil of a timing relay 289. Contacts 289 of this relay are thus closed setting up a circuit through closed contacts of a further timing relay 292, energizing a relay 294. This latter relay in turn closes contacts 296, setting up a circuit to, and energizing, a relay 298. As this latter relay is energized it closes contacts 299 and 300, thereby actuating a control coil 302 to shift a four-way valve to admit air under pressure to the pusher cylinder at the right-hand side of Fig. 11 and at the same time exhaust the air from the left-hand side which has acted to return the pusher to its initial position.

As air is admitted beyond the cylinder the pusher moves forwardly, engaging the rear end of the sheet on the star wheel and feeding the same between the pinch rolls 30. Just before the sheet enters the pinch rolls it strikes and passes over a flag switch provided with a normally open contact 303 and a normally closed contact 305. As the end of the sheet passes over the switch it releases the same, closing contacts 305. The effect of this, as shown in the wiring diagram, is to begin the downward movement of the feeding suckers and commence a new cycle by which succeeding sheets are fed to the pinch rolls.

As the suckers start down again the switch 287 is opened and this deenergizes the solenoid 302 releasing the corresponding four-way valve for return by a spring to a position where air is admitted to the left-hand side of cylinder 76 and exhausted from the right, thus returning the pusher to its initial position.

*Mechanism operating after sheet leaves mill*

A sheet just fed into the mill passes between the rolls 15 and is engaged by a feed-out set of pinch rolls and by them passed out onto the right-hand star wheel mechanism (Figs. 2 and 3). This mechanism is then operated in a manner to be described, to pile the sheet onto a conveyor therebeneath. The piling is attained by rotating the star wheels in such a direction that the sheet supported thereon drops through onto the conveyor (Figs. 7 through 9).

Thus, as a sheet leaves the mill it engages a limit switch 303 on the feed-out side which operates through contacts 206 of a relay 240 to energize a relay 307 on the feed-out side of the mill. This closes contacts 309 to energize a relay 310, which in turn closes contacts 312 and, acting through normally closed contacts 314 of a relay 315, operates to energize a relay 317.

At this time the star wheels are ready to be rotated in a direction to drop the sheet thereon onto the top of the pile underneath. This is effected when the relays 317 close contacts 318, in turn energizing a pull-in coil 319 of a contactor 320.

The foregoing description recites the parts and functions of the electrical circuits by which a sheet is handled from the time it is picked up by the vacuum cups until it is dropped by the feed-out star wheels. It will be understood that a corresponding series of circuits are established when feeding a sheet in the reverse direction through the mill. The unprimed figures as above described refer to feeding sheets from right to left (Fig. 2).

*Electrical connections not directly connected with sheet feeding*

It will be apparent that as sheets are removed from one conveyor and deposited on the other the former should be raised and the latter lowered to provide for differences in pile height as the rolling operations proceed. I have found that a satisfactory way to accomplish this is to intermittently raise and lower the feed-in and feed-out piles at times when predetermined thicknesses of stock have been removed from or placed upon the conveyors. The apparatus may be so set that each time there is a two or four inch variation in the height of the stack, the same may be adjusted to bring the top level within the desired height limits. It will be understood that the dimensions above named are arbitrary and are in no sense critical, but represent only examples of what may be accomplished.

As a charge of sheets is first rolled into the equipment a limit switch 321 is closed and remains closed as long as there are any sheets on the pile. The limit switch 321 operates to terminate any further upward movement of the stack after the last sheet has been removed. Thus, even if the stack is in process of being elevated its movement will terminate at such time. The closing of this limit switch energizes a relay 322 through normally closed contacts 323 of the relay 250. The relay 322 remains energized at all times except when the relay 250 is itself energized, opening the contacts 323. The relay 250, through contacts 324, controls the raising of the depiler through the pull-in coil 325 of the contactor 326. Likewise the relay 250, through its contacts 328 also controls the energizing of a relay 330, which furnishes a hot line to the limit switch 254, through which the above mentioned relay 250 is energized. Power is drawn from the line L—1 through contact 229 of the relay 227. This circuit is maintained through contacts 332 of the relay 250 even though the contacts 331 are open.

To control the stack height, limit switch mechanism is provided which functions on the depiling side to periodically raise the stack as sheets are removed from it and likewise on the piling side to lower the stack as sheets are placed thereon. This mechanism is so mounted that at the time sheets are removed from the pile the switches controlling the lowering of the pile are withdrawn out of the range of feed. In the same manner, at the stack on which sheets are being piled, the limit switch mechanism which functions to raise the stack, is moved out of the region of travel of the sheets. Such apparatus is shown in Figs. 21 and 22.

Referring now to those figures, there is provided a flat base 340 on which are slidably mounted supports 351 and 353 to carry limit switches 343 and 355 and 335 and 334 respectively. The supporting members are pivotally connected by a rock bar 360 pivoted as at 361 to the frame member 340. An extension of the support 353 terminates in a piston 365 carried in a cylinder 367. The cylinder in turn is operated at its left hand side (Fig. 21) with fluid under pressure controlled by a valve 370 actuated by a solenoid 372. From the description thus far it will be apparent that as fluid under pressure is admitted to the cylinder 367, it will move the support 353 toward the right (Fig. 21). Due to the connection through the pivoted member 360, the support 351 at the same time will move toward the left or into position to be engaged by the sheets on the pile.

In this position, as sheets are dropped onto the pile, they are dropped over and rock the limit switches 343 and 355, which after the sheet has passed will return to their first position, shown in Fig. 22. There will come a time as sheets are piled when the switch 343, by reason of the stack height, cannot return to its initial position. When this happens, a delayer timing relay will operate to drop the stack a predetermined distance as mentioned heretofore.

When the stack attains such height the switch 355 act to cut off the current supply to the stack raising motor 65 by releasing the coil 343ᵃ holding the switch 345.

To raise the stack as sheets are removed therefrom during the depiling operation the limit switches 334 and 335 are provided. As sheets are removed from the stack the height of the pile will diminish until a point is reached at which the limit switch 335 may drop out into a position partially overlying one edge of the stack. This movement of the switch will establish a circuit through a coil 349 to close a contactor 350, setting up rotation of the motor 65 in such a direction as to raise the pile. After the stack is raised a preselected amount the holding coil 345 is deenergized by the action of the limit switch 334 bearing against the pile and being engaged by the top of the stack as it is raised.

The amount the stack may be raised or lowered may be varied within desired ranges by adjusting the position at which the cut-off switches 355 or 335, as the case may be, are operated.

The description above relates to the operation of the handling equipment in one direction and, as indicated, it is intended that the operation may be effected in either direction through the mill. Thus, after the sheets have been passed in one direction through the mill the handling equipment and the mill may be reversed to permit feeding the sheets back through in a direction opposite to that they have just traversed. To reverse the entire handling equipment the main switch 210 is thrown to a reverse position from that in which it was previously positioned for the preceding sheet feeding. Under these circumstances those instruments which are marked in Figs. 10ᵃ and 10ᵇ with primed characters will now become operative to control the equipment while those instruments indicated by the unprimed figures will become inactive.

Other forms may be employed embodying the features of my invention instead of the one herein explained, change being made as regards the means and the steps herein disclosed, provided the elements stated by any of the following claims or the equivalent of such stated elements be employed, whether produced by my preferred method or by others embodying steps equivalent to those stated in the following claims.

I therefore particularly point out and distinctly claim as my invention:

1. In a machine for feeding sheet material to and from an operating station, a plurality of rotatable supporting members having radially projecting arms thereon, said members being positioned to engage opposite edges of the sheet, sheet lifting means above said rotatable supporting members and constructed to move between said supporting members, means for rotating said supporting members and moving said lifting means in timed relation in one direction to unpile the sheets and for rotating said supporting members in the opposite direction to pile the sheets and means for feeding the sheets along said supporting members.

2. In a machine for feeding sheet material to and from an operating station, an elongated rotatable member lying substantially parallel with each side edge of the sheet and having a plurality of sets of spaced radially projecting supporting arms thereon, said arms being positioned to engage opposite edges of the sheet, sheet lifting means above said rotatable supporting members and constructed to move between said supporting members, means for rotating said supporting members and moving said lifting means in timed relation in one direction to unpile the sheets and for rotating said supporting members in an opposite direction to pile the sheets, and means for feeding the sheets along said supporting members.

3. In a machine for feeding sheet material to and from an operating station, an elongated rotatable member lying substantially parallel with each side edge of the sheet and having a plurality of sets of spaced radially projecting supporting arms thereon, rollers carried by each of said arms, said arms being positioned to engage opposite edges of the sheet, sheet lifting means above said rotatable supporting members and constructed to move between said supporting members, means for rotating said supporting members and moving said lifting means in timed relation in one direction to unpile the sheets and for rotating said supporting members in an opposite direction to pile the sheets, and means for feeding the sheets along said supporting members.

4. In a machine for feeding sheet material to and from an operating station, a plurality of rotatable supporting members having radially projecting arms thereon, said members being positioned on opposite sides of the operating station and engaging opposite edges of the sheet, sheet lifting means above said supporting members and constructed to move between said supporting members, means for rotating the supporting members and moving the lifting means at one side of the operating station in timed relation in one direction to unpile the sheets and for rotating the supporting members on the other side of the operating station in the opposite direction to pile the sheets and means for feeding the sheets along said supporting members.

5. In a machine for feeding sheet material to and from an operating station, a plurality of rotatable supporting members having radially projecting arms thereon, said members being positioned on opposite sides of the operating station to engage opposite edges of the sheet, sheet lifting means above said rotatable supporting members and constructed to move between said supporting members, means for rotating the supporting members and moving the lifting means at one side of the operating station in timed relation in one direction to raise the lifting means and cause the radial arms of the supporting members to travel upwardly to unpile the sheets and for rotating the supporting members on the other side of the operating station in the opposite direction to cause the radial arms on the last mentioned supporting members to travel downwardly to pile the sheets and means for feeding the sheets along said supporting members.

6. In a machine for feeding sheet material to and from an operating station, a plurality of rotatable supporting members having radially projecting arms thereon, said members being positioned on opposite sides of the operating station to engage opposite edges of the sheet, sheet lifting means above said rotatable supporting members and constructed to move between said supporting members, means for rotating said supporting members and moving said lifting means at one side of the operating station in timed relation in one direction to raise the lifting means and cause the radial arms to travel upwardly to unpile the sheets and for rotating said supporting members on the other side of the operating station in the opposite direction to cause the radial arms to travel downwardly to pile the sheets, means for feeding the sheets along said supporting members, a stop at one end of said supporting members lying in the path of travel of said sheets, and means operative upon contact between said sheet and stop to cause rotation of the supporting members in said piling direction.

7. In a machine for feeding sheet material to and from an operating station, a plurality of rotatable supporting members having radially projecting arms thereon, said members being positioned on opposite sides of the operating station and engaging opposite edges of the sheet, sheet lifting means above said supporting members and constructed to move between said supporting members, means for rotating the supporting members and moving the lifting means at one side of the operating station in timed relation in one direction to unpile the sheets and for rotating the supporting members on the other side of the operating station in the opposite direction to pile the sheets, means for feeding the sheets along said supporting members, piling and unpiling tables at opposite ends of the machine and means for elevating or lowering said tables as the sheets are taken from or deposited on the same respectively.

8. In a machine for feeding sheet material to and from an operating station, a platform, a plurality of rotatable supporting members having radially projecting arms thereon, said members being positioned above said platform and in position to engage opposite edges of the sheet, sheet lifting means above said rotatable supporting members and constructed to move between said supporting members, means for rotating said supporting members and moving said lifting means in timed relation in one direction to unpile the sheets and for rotating said supporting members in opposite direction to pile the sheets, means for feeding the sheets along said supporting members and means between the supporting members and platform through which the sheets pass as they are piled on the platform to vertically align said sheets.

9. In a machine for feeding sheet material to and from an operating station, a plurality of rotatable supporting members having radially projecting arms thereon, said members being positioned to engage opposite edges of the sheet, sheet lifting means above said rotatable supporting members and constructed to move between said supporting members, means for rotating said supporting members and moving said lifting means in timed relation in one direction to unpile the sheets and for rotating said supporting members in the opposite direction to pile the sheets and reciprocating means for feeding the sheets along said supporting members.

10. In a machine for feeding sheet material to and from an operating station, a plurality of rotatable supporting members having radially projecting arms thereon, said members being positioned to engage opposite edges of the sheet, sheet lifting means above said rotatable supporting members and constructed to move between said supporting members, means for rotating said supporting members and moving said lifting means in timed relation in one direction to unpile the sheets and means for feeding the sheets along said supporting members.

LEONARD W. NASH.